United States Patent [19]

Hubbell et al.

[11] Patent Number: 6,130,046
[45] Date of Patent: Oct. 10, 2000

[54] TECHNIQUES FOR SYNTHESIS INTEGRITY EVALUATION UTILIZING CYCLE FIDELITY PROBES

[75] Inventors: Earl A. Hubbell, Los Angeles; David P. Smith, San Jose, both of Calif.

[73] Assignee: Affymetrix, Inc., Santa Clara, Calif.

[21] Appl. No.: 09/144,514

[22] Filed: Aug. 31, 1998

Related U.S. Application Data

[63] Continuation-in-part of application No. 09/072,394, May 4, 1998, abandoned
[60] Provisional application No. 60/098,553, May 4, 1998, abandoned.

[51] Int. Cl.[7] .................... C12Q 1/60; G01N 33/48; C12P 19/34; C07H 21/00
[52] U.S. Cl. .................. 435/6; 435/91.1; 435/94; 530/350; 702/19; 702/20; 536/25.3
[58] Field of Search .................. 435/6, 911, 94; 530/350; 536/25.3; 702/19, 20

[56] References Cited

U.S. PATENT DOCUMENTS 5,143,854  9/1992  Pirrung et al. ..................... 436/518

FOREIGN PATENT DOCUMENTS

WO 98/12559  3/1998  WIPO .

OTHER PUBLICATIONS

McGall et al, "Light–directed synthesis of high–density oligonucleotide arrays using semiconductor photoresists", Proc. Natl. Acad. Sci. 93:13555–13560, Nov. 1996.

Pirrung et al, "Comparison of methods for photochemical phosphoramidite based DNA synthesis"J. Org. Chem. 60:6270–6276, 1995.

*Primary Examiner*—Jeffrey Fredman
*Attorney, Agent, or Firm*—Ritter, VanPelt & Yi LLP

[57] ABSTRACT

Techniques for designing polymer probes to verify the integrity of the probe synthesis are provided. Multiple probes with identical sequences are designed so that the probes will be formed utilizing at least one different monomer addition cycle. Based on the probes affinity to a control target, variations (e.g., errors) in probe synthesis may be identified.

11 Claims, 14 Drawing Sheets

|   | 1 | 2 | 3 | 4 | 5 | 6 | 7 | 8 |
|---|---|---|---|---|---|---|---|---|
| 1 | X | 1 | 1 | 1 | 0 | 1 | 1 | 1 |
| 2 | 1 | X | 0 | 0 | 0 | 1 | 1 | 1 |
| 3 | 1 | 0 | X | 0 | 0 | 1 | 1 | 1 |
| 4 | 1 | 0 | 0 | X | 0 | 1 | 1 | 1 |
| 5 | 0 | 0 | 0 | 0 | X | 0 | 0 | 0 |
| 6 | 1 | 1 | 1 | 1 | 0 | X | 0 | 0 |
| 7 | 1 | 1 | 1 | 1 | 0 | 0 | X | 0 |
| 8 | 1 | 1 | 1 | 1 | 0 | 0 | 0 | X |

*FIG. 8*

SEQUENCE LISTING (1) GENERAL INFORMATION:

(iii) NUMBER OF SEQUENCES: 4

(2) INFORMATION FOR SEQ ID NO:1:

(i) SEQUENCE CHARACTERISTICS:
      (A) LENGTH: 17 base pairs
      (B) TYPE: nucleic acid
      (C) STRANDEDNESS: single
      (D) TOPOLOGY: linear (xi) SEQUENCE DESCRIPTION: SEQ ID NO:1:

CTGAACGGTA GCATCTT                              17

(2) INFORMATION FOR SEQ ID NO:2:

(i) SEQUENCE CHARACTERISTICS:
      (A) LENGTH: 17 base pairs
      (B) TYPE: nucleic acid
      (C) STRANDEDNESS: single
      (D) TOPOLOGY: linear (xi) SEQUENCE DESCRIPTION: SEQ ID NO:2:

TGAACGGTAG CATCTTG                              17

(2) INFORMATION FOR SEQ ID NO:3:

(i) SEQUENCE CHARACTERISTICS:
      (A) LENGTH: 17 base pairs
      (B) TYPE: nucleic acid
      (C) STRANDEDNESS: single
      (D) TOPOLOGY: linear (xi) SEQUENCE DESCRIPTION: SEQ ID NO:3:

GAACGGTAGC ATCTTGA                              17

(2) INFORMATION FOR SEQ ID NO:4:

(i) SEQUENCE CHARACTERISTICS:
      (A) LENGTH: 17 base pairs
      (B) TYPE: nucleic acid
      (C) STRANDEDNESS: single
      (D) TOPOLOGY: linear (xi) SEQUENCE DESCRIPTION: SEQ ID NO:4:

AACGGTAGCA TCTTGAC                              17

TECHNIQUES FOR SYNTHESIS INTEGRITY EVALUATION UTILIZING CYCLE FIDELITY PROBES

This is a continuation-in-part of U.S. patent application Ser. No. 09/072,394, filed May 4, 1998, which was converted to provisional No. 60/098,553, now abandoned which is hereby incorporated by reference.

BACKGROUND OF THE INVENTION

The present invention relates to the verification of the synthesis of polymers, which may be polymer probes. More specifically, the present invention relates to designing polymer probes that have the same sequence but are formed with at least one different monomer addition cycle so that the integrity of the probes may be verified.

Devices and computer systems for forming and using arrays of materials on a chip or substrate are known. For example, PCT applications WO92/10588 and 95/11995, both incorporated herein by reference for all purposes, describe techniques for sequencing or sequence checking nucleic acids and other materials. Arrays for performing these operations may be formed according to the methods of, for example, the pioneering techniques disclosed in U.S. Pat. Nos. 5,445,934, 5,384,261 and 5,571,639, each incorporated herein by reference for all purposes.

According to one aspect of the techniques described therein, an array of nucleic acid probes is fabricated at known locations on a chip. A labeled nucleic acid is then brought into contact with the chip and a scanner generates an image file indicating the locations where the labeled nucleic acids are bound to the chip. Based upon the image file and identities of the probes at specific locations, it becomes possible to extract information such as the nucleotide or monomer sequence of DNA or RNA. Such systems have been used to form, for example, arrays of DNA that may be used to study and detect mutations relevant to genetic diseases, cancers, infectious diseases, HIV, and other genetic characteristics.

The VLSIPS™ technology provides methods of making very large arrays of oligonucleotide probes on very small chips. See U.S. Pat. No. 5,143,854 and PCT patent publication Nos. WO 90/15070 and 92/10092, each of which is incorporated by reference for all purposes. The oligonucleotide probes on the DNA probe array are used to detect complementary nucleic acid sequences in a sample nucleic acid of interest (the "target" nucleic acid).

For sequence checking applications, the chip may be tiled for a specific target nucleic acid sequence. As an example, the chip may contain probes that are perfectly complementary to the target sequence and probes that differ from the target sequence by a single base mismatch. For de novo sequencing applications, the chip may include all the possible probes of a specific length. The probes are tiled on a chip in rows and columns of cells, where each cell includes multiple copies of a particular probe. Additionally, "blank" cells may be present on the chip which do not include any probes. As the blank cells contain no probes, labeled targets should not bind specifically to the chip in this area. Thus, a blank cell provides a measure of the background intensity.

Although the photolithographic equipment for synthesizing chips is extremely accurate, occasionally variations occur in the manufacturing process. For example, errors may occur if a chemical is not be added, a wash step is skipped, concentrations are not correct, timing is incorrect, the wrong mask is utilized, the correct mask is misaligned, and the like. It is often very difficult to detect any errors at all and many of the errors only affect a small limited number of probes on the chip. For stringent quality control, for example, it would be desirable to detect variations in the manufacturing process before the chips are shipped to customers. Additionally, it would be desirable to have an indication of what was the cause of the error so that it can be corrected.

SUMMARY OF THE INVENTION

The present invention provides innovative techniques for designing polymer probes to verify the integrity of the probe synthesis. Multiple probes with identical sequences are designed so that the probes will be formed utilizing at least one different monomer addition cycle. Based on the probes affinity to a control target or sequence, variations (e.g., errors) in probe synthesis may be identified. Several embodiments of the invention are described below.

In one embodiment, the invention provides a method of designing polymer probes. A control sequence of monomers is provided and polymer probes that have the same sequence of monomers and will bind with the control sequence are designed. The probes are formed with at least one different monomer addition cycle so that the integrity of the polymer probes may be verified. In a preferred embodiment, the probes are sequences of nucleotides that are attached to a substrate.

In another embodiment, the invention provides a substrate having polymer probes coupled thereto. Multiple regions on the substrate include diverse (i.e., different sequences) polymer probes. There are also multiple regions on the substrate in which probes having the same sequence are coupled. The polymer probes with the same sequence will bind with a control sequence of monomers but are formed with at least one different monomer addition cycle. This allows the integrity of the polymer probes on the substrate to be verified.

In another embodiment, the invention provides a method of verifying probe synthesis. Hybridization affinity information regarding the binding of a control sequence of monomers to polymer probes that have the same sequence of monomers is received. The hybridization affinity information is analyzed to determine if an error occurred during the synthesis of the polymer probes. In preferred embodiments, a determination is generated that indicates whether the probe synthesis was acceptable or unacceptable.

In another embodiment, the invention provides a method of verifying a manufacturing process including multiple steps. First steps are selected from the manufacturing process for producing a first verification object. Second steps are selected from the manufacturing process for producing a second verification object. The second verification object is the same as the first verification object but the second steps differ from the first steps by at least one step. The verification objects can have the same structure and/or be polymer probes, mechanical devices or electronic circuits.

In another embodiment, the invention provides a method of verifying a manufacturing process including multiple steps. Structure information about multiple verification objects is received, where each verification object has the same structure but differs from the other verification objects by at least one step of the manufacturing process that was used to produce the verification objects. The structure information is analyzed to determine if an error occurred during the synthesis of the multiple verification objects.

Other features and advantages of the invention will become readily apparent upon review of the following detailed description in association with the accompanying drawings.

BRIEF DESCRIPTION OF THE DRAWINGS

FIG. 8 shows a matrix that may be utilized to prevent the repetition of lists of cycles.

DETAILED DESCRIPTION OF PREFERRED EMBODIMENTS

Overview

In the description that follows, the present invention will be described in reference to preferred embodiments that utilize VLSIPS™ technology for making very large arrays of oligonucleotide probes on chips. However, the invention is not limited to this technology and may be advantageously applied to other manufacturing processes. For example, the following will discuss selected polymer probes that are used as verification objects to evaluate the integrity of the synthesis process of producing the polymer probes. However, the objects created by the manufacturing process is not limited to polymer probes and can be advantageously applied to other technology areas including mechanical devices, electronic circuits and the like. Therefore, the description of the embodiments that follows for purposes of illustration and not limitation.

Figure 1:
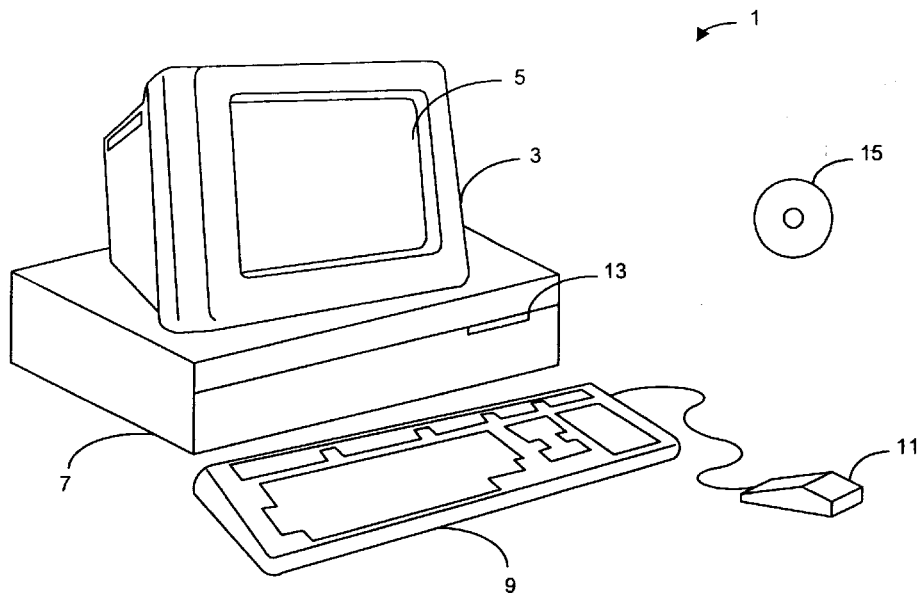
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although a CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
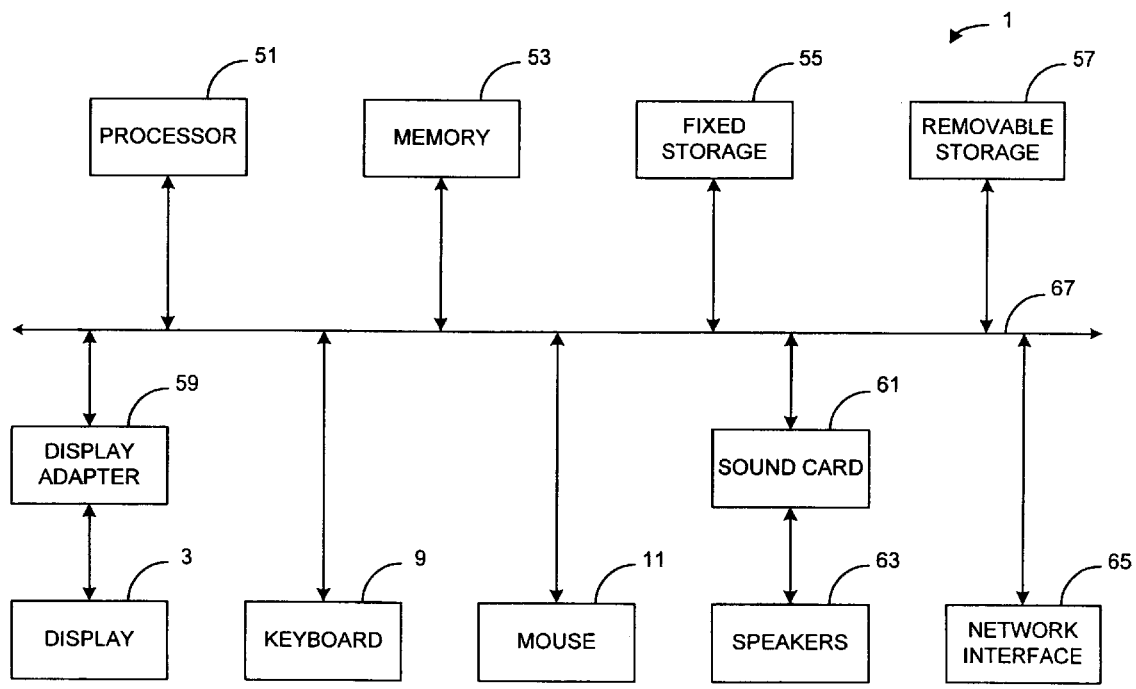
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

For purposes of illustration, the present invention is described as being part of a computer system that designs a chip mask, synthesizes the probes on the chip, labels the nucleic acids, and scans the hybridized nucleic acid probes. Such a system is fully described in U.S. Pat. No. 5,571,639 that has been incorporated by reference for all purposes. However, the present invention may be used separately from the overall system for analyzing data generated by such systems.

Figure 3:
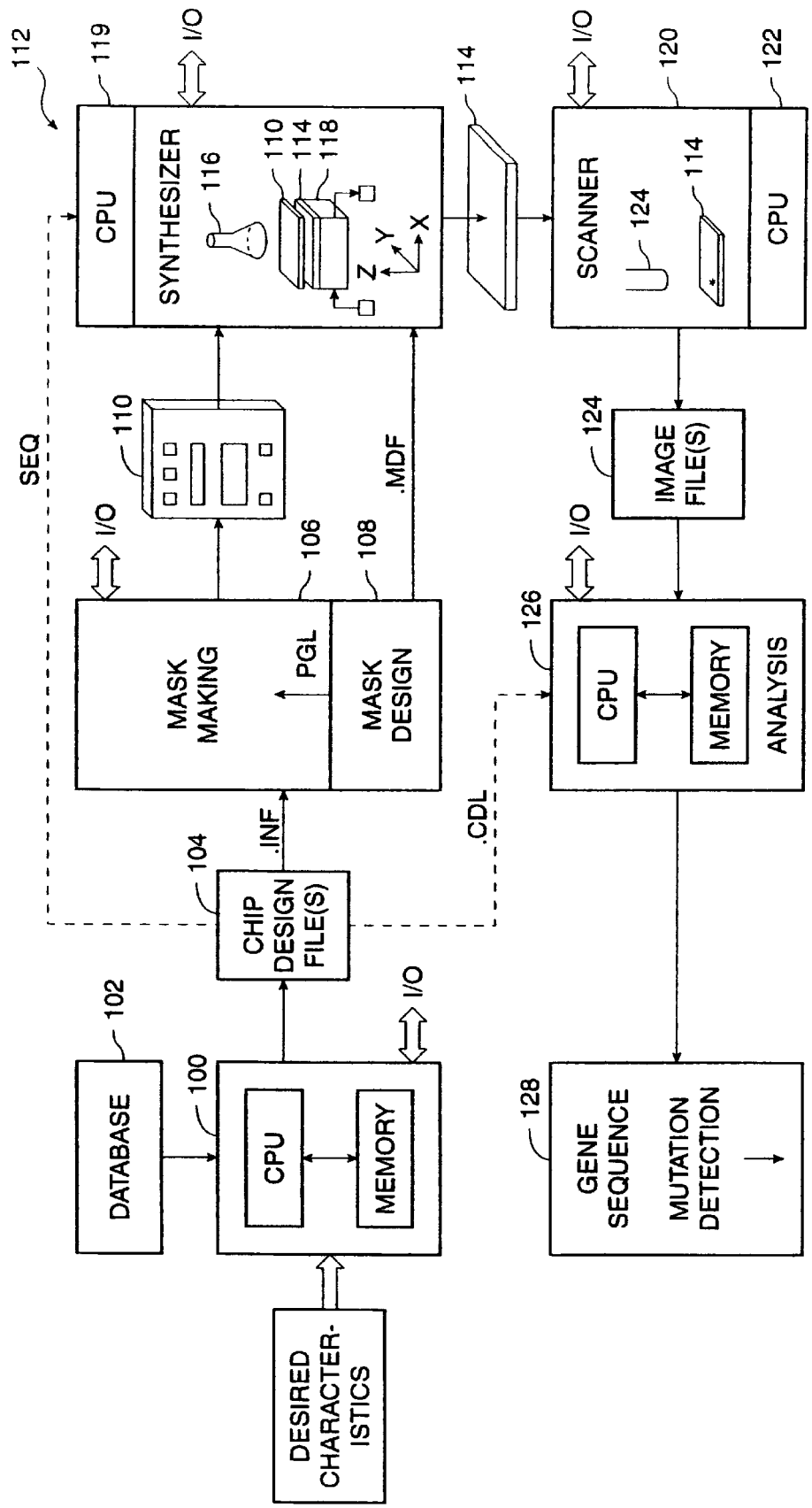
FIG. 3 illustrates an overall system for forming and analyzing arrays of biological materials such as DNA or RNA.

FIG. 3 illustrates a computerized system for forming and analyzing arrays of biological materials such as RNA or DNA. A computer 100 is used to design arrays of biological polymers such as RNA and DNA. The computer 100 may be, for example, an appropriately programmed Sun Workstation or personal computer or workstation, such as an IBM PC equivalent, including appropriate memory and a CPU as shown in FIGS. 1 and 2. The computer system 100 obtains inputs from a user regarding characteristics of a gene of interest, and other inputs regarding the desired features of the array. Optionally, the computer system may obtain information regarding a specific genetic sequence of interest from an external or internal database 102 such as GenBank. The output of the computer system 100 is a set of chip design computer files 104 in the form of, for example, a switch matrix, as described in PCT application WO 92/10092, and other associated computer files.

The chip design files are provided to a system 106 that designs the lithographic masks used in the fabrication of arrays of molecules such as DNA. The system or process 106 may include the hardware necessary to manufacture masks 110 and also the necessary computer hardware and software 108 necessary to lay the mask patterns out on the mask in an efficient manner. As with the other features in FIG. 3, such equipment may or may not be located at the same physical site but is shown together for ease of illustration in FIG. 3. The system 106 generates masks 110 or other synthesis patterns such as chrome-on-glass masks for use in the fabrication of polymer arrays.

The masks 110, as well as selected information relating to the design of the chips from system 100, are used in a synthesis system 112. Synthesis system 112 includes the necessary hardware and software used to fabricate arrays of polymers on a substrate or chip 114. For example, synthesizer 112 includes a light source 116 and a chemical flow cell 118 on which the substrate or chip 114 is placed. Mask 110 is placed between the light source and the substrate/chip, and the two are translated relative to each other at appropriate times for deprotection of selected regions of the chip. Selected chemical regents are directed through flow cell 118 for coupling to deprotected regions, as well as for washing and other operations. All operations are preferably directed by an appropriately programmed computer 119, which may or may not be the same computer as the computer(s) used in mask design and mask making.

The substrates fabricated by synthesis system 112 are optionally diced into smaller chips and exposed to marked targets. The targets may or may not be complementary to one or more of the molecules on the substrate. The targets are marked with a label such as a fluorescein label (indicated by an asterisk in FIG. 3) and placed in scanning system 120. Although preferred embodiments utilize fluorescent markers, other markers may be utilized that provide differences in radioactive intensity, light scattering, refractive index, conductivity, electroluminescence, or other large molecule detection data. Therefore, the present invention is not limited to analyzing fluorescence measurements of hybridization but may be readily utilized to analyze other measurements of hybridization.

Scanning system 120 again operates under the direction of an appropriately programmed digital computer 122, which also may or may not be the same computer as the computers used in synthesis, mask making, and mask design. The scanner 120 includes a detection device 124 such as a confocal microscope or CCD (charge-coupled device) that is used to detect the location where labeled target (*) has bound to the substrate. The output of scanner 120 is an image file(s) 124 indicating, in the case of fluorescein labeled target, the fluorescence intensity (photon counts or other related measurements, such as voltage) as a function of position on the substrate. Since higher photon counts will be observed where the labeled target has bound more strongly to the array of polymers (e.g., DNA probes on the substrate), and since the monomer sequence of the polymers on the substrate is known as a function of position, it becomes possible to determine the sequence(s) of polymer(s) on the substrate that are complementary to the target.

The image file 124 is provided as input to an analysis system 126 that incorporates the synthesis integrity evaluation techniques of the present invention. Again, the analysis system may be any one of a wide variety of computer system(s), but in a preferred embodiment the analysis system is based on a WINDOWS NT workstation or equivalent. The analysis system may analyze the image file(s) to generate appropriate output 128, such as the identity of specific mutations in a target such as DNA or RNA.

Figure 4:
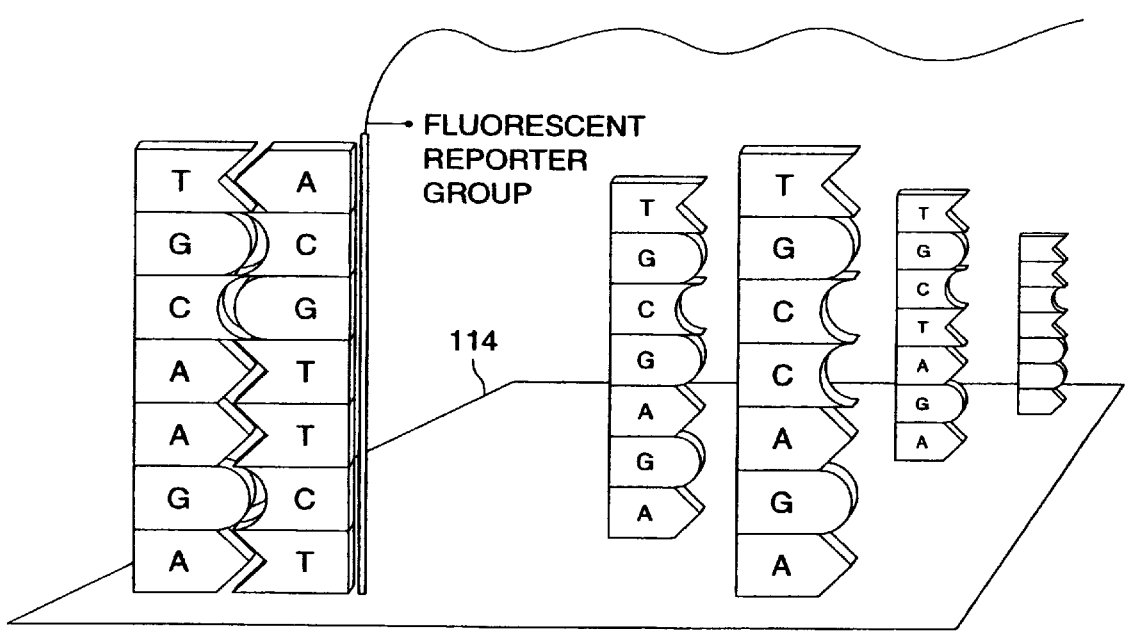
FIG. 4 illustrates conceptually the binding of probes on chips.

FIG. 4 illustrates the binding of a particular target DNA to an array of DNA probes 114. As shown in this simple example, the following probes are formed in the array:

3'-AGAACGT
     AGACCGT
     AGAGCGT
     AGATCGT
      •
      •
      •

As shown, when the fluorescein-labeled (or otherwise marked) target 5'-TCTTGCA is exposed to the array, it is complementary only to the probe 3'-AGAACGT, and fluorescein will be primarily found on the surface of the chip where 3'-AGAACGT is located. The chip contains cells that include multiple copies of a particular probe and the cells may be square regions on the chip.

Figure 5:
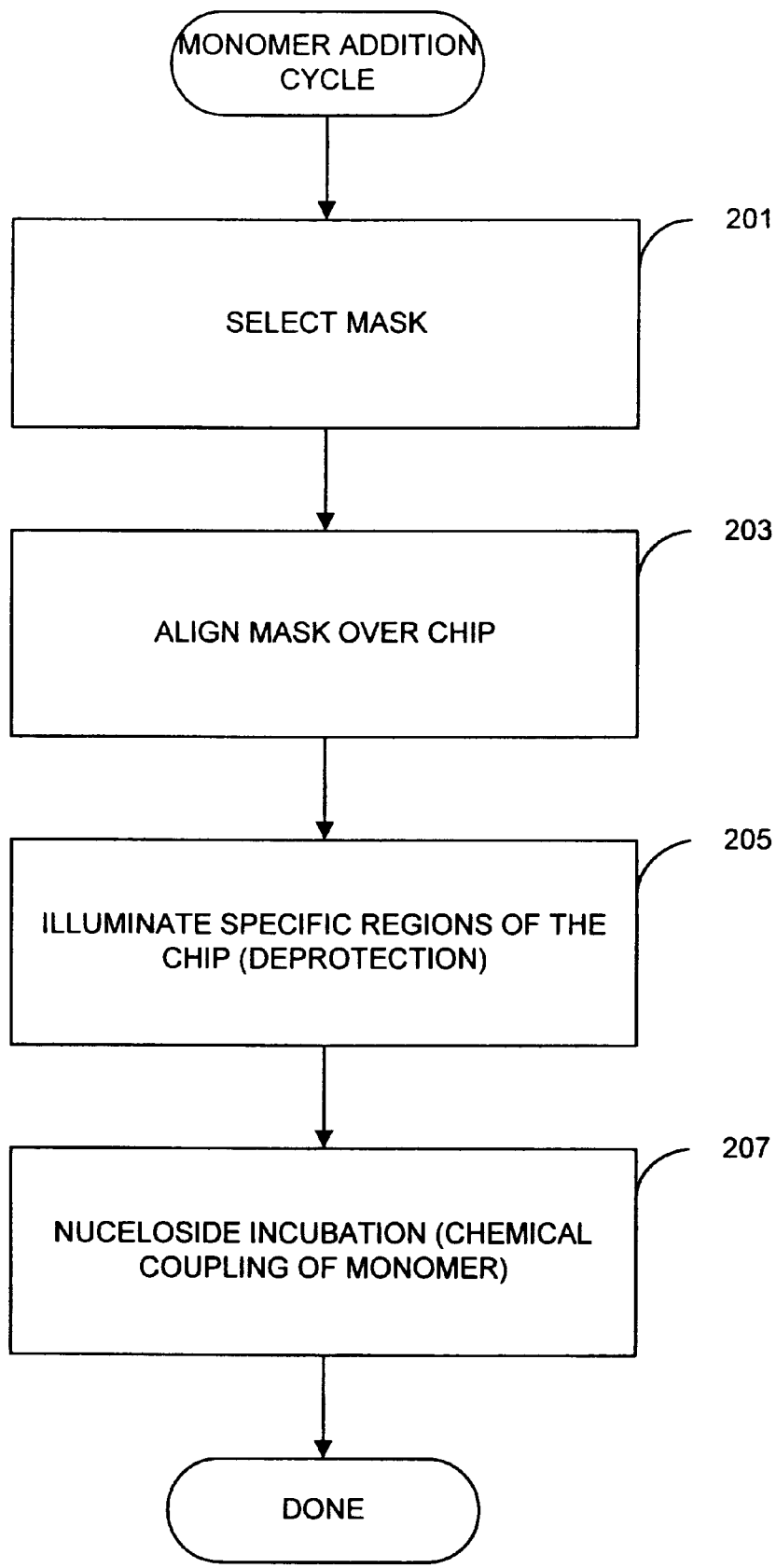
FIG. 5 illustrates a high level flowchart of a monomer addition cycle for synthesizing probes in one embodiment.

FIG. 5 is a high level flowchart of a monomer addition cycle for synthesizing probes. The addition of a monomer typically includes multiple steps, which are repeated over and over to synthesize the desired probes. When used herein, the term "monomer addition cycle" (or "cycle") refers to the steps performed to couple a monomer to one or more probes. FIG. 5 shows a representative flowchart of a monomer addition cycle; however, as with all flowcharts disclosed herein, a cycle may include fewer, more or different steps so the invention is not limited to any specific implementation.

At a step 201, a mask is selected. A mask is typically a photolithographic member for the selective passage of light. For example, some regions may be opaque while other regions are relatively clear. The light that passes through the mask may deprotect probes at specific regions on the chip allowing for further monomer coupling. The invention may also be readily applied to technologies that utilize light protection.

Once a mask is selected, the mask is aligned over the chip at a step 203. Specific regions of the chip are then illuminated through the chip (deprotection) at a step 205.

At a step 207, nucleoside phosphoramidite activation is performed to chemically couple a monomer to selected probes on the chip. Step 207 may include many steps including amidite delivery, activator delivery, oxidant delivery, and washes.

In order to manufacture a chip, the monomer addition cycle may be repeated tens or hundreds of times. Although the manufacturing process is highly accurate, one or more errors may occur. Errors, if they occur, typically only affect a limited number of probes on the chip. Accordingly, it may be very difficult to determine if an error occurred or, more importantly, what the error was so that it may be prevented in the future.

Synthesis Integrity Evaluation

Tens, if not hundreds, of monomer additions cycles may be necessary to manufacture the desired probes on a chip. In general, the invention provides techniques of designing polymer probes to verify the integrity of the probes. When used herein, a "polymer" is a sequence of more than one monomer, including oligomers. In preferred embodiments, multiple probes with identical sequences are designed so that the probes will be formed utilizing at least one different monomer addition cycle. Based on the probes' affinity to a control sequence, variations (e.g., errors) in probe synthesis may be identified.

In one embodiment, the cycles of A, C, G, and T are repeated until the desired probes are synthesized on the chip. Nevertheless, there may be many combinations of cycles that can form the same probe. For example, assume that probes on the chip will be synthesized with the following eight monomer addition cycles: A, C, G, T, A, C, G, T. Further assume that it is desired to synthesize the probe of 3'-ACGT on the chip. As the following shows, the desired probe may be formed by a number of different cycles.

```
ACGTACGT        (cycles)
ACGT            (probe 1)

AC    GT        (probe 2)
```

```
              -continued
         ACGT              (probe 3)

ACG       T            (probe 4)

A         CGT          (probe 5)

.
                .
                .
```

The top line (underlined) shows the cycles and the probes are shown below to indicate what cycles were utilized to synthesize the probes. The numbers of the probes (e.g., 1–5) are given merely for identification purposes. Although probe 1 and probe 3 are identical in sequence, their respective cycles are totally different. Other probes have cycles in common and at least one that differs. If there is an error in the first C cycle, probes 1, 2 and 4 may be affected, yet it would be expected that probes 3 and 5 would be unaffected.

As an example, if the error in the first C cycle resulted in C not being added to probe 1, the probe would be 3'-AGT. If a labeled control target of 5'-TGCA is hybridized to probe 1, the hybridization affinity should be lower, typically quite lower than the hybridization affinity of an error free probe 3. Furthermore, if the hybridization affinities of probes 1, 2 and 4 are quite lower than the hybridization affinities of probes 3 and 5, this indicates the first C cycle likely had an error since this cycle was used to form probes 1, 2 and 4 but not probes 3 and 5. Preferred embodiments of the invention utilize such information to detect and identify synthesis errors.

Synthesizing control probes on the chip may be beneficial for detecting synthesis errors, but it is also preferable that the control probes do not occupy too much real estate on the chip. It is therefore desirable to utilize as few of probes a possible to evaluate the integrity of as many cycles as possible, preferably all cycles. In order to achieve this goal, some embodiments of the invention utilize the following two conditions:

1) all cycles should be utilized in at least four probes
2) for any two cycles, there should be at least two probes in which one cycle was utilized and the other was not It should be remembered that these conditions, or any conditions, are not necessary for the invention. Additionally, other conditions may be developed without departing from the spirit of the invention.

Referring back to the probes above, condition 1 is satisfied for the first A cycle by probes 1, 2, 4, and 5 because this cycle appears in all four probes. As for condition 2, probes 1 and 2 satisfy the condition for the first A cycle and the second C cycle because both probes were synthesized with the first A cycle but not the second C cycle. If probe 2 was instead synthesized with the second C cycle but not the first A cycle, condition 2 would still be satisfied by probes 1 and 2. In other words, condition 2 is directed to having at least two probes in which two cycles may be distinguished. Condition 2 is not satisfied for the first A cycle and the first C cycle by the five probes shown above since there is only one probe, probe 5, in which one cycle appears and the other does not.

An acyclic directed graph may be utilized to identify lists of cycles that would satisfy the two conditions. In a preferred embodiment, the acyclic directed graph includes edges such that every path from the source of the graph to the sink is a valid set of cycles for synthesizing a probe of the desired sequence. This graph could, for example, include all such paths representing valid syntheses. Such a graph can be stored and obtained by using standard data structures and algorithms.

Figure 6A:
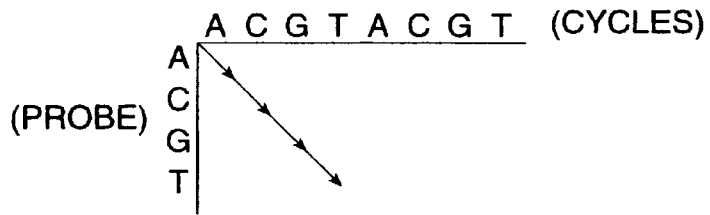
FIGS. 6A and 6B show acyclic directed graphs that may be utilized to identify cycles of interest.
Figure 6B:
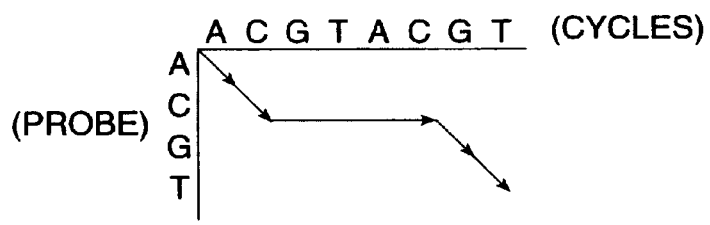

FIGS. 6A and 6B show acyclic directed graphs that may be utilized to form the simple probe 3'-ACGT discussed above. FIG. 6A shows an acyclic directed graph depicting the synthesis of probe 1 above. The different cycles are listed on the top of the drawing and the desired probe is listed on the left side of the drawing. Each edge (or diagonal arrow) indicates the cycle that was utilized to add each monomer in the probe. Similarly, FIG. 6B shows an acyclic directed graph depicting the synthesis of probe 2 above. The horizontal arrow indicates that four cycles in a row were not utilized in synthesizing the probe.

To produce a specific list of synthesis cycles for the synthesis of a probe, a path can be picked within this graph. In a preferred embodiment, this path is constructed by weighting the edges of the graph and choosing a shortest path within the weighted graph.

Figure 7A:
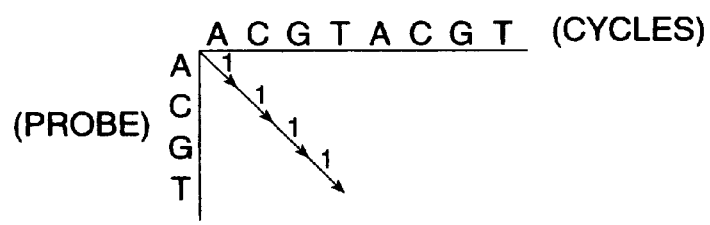
FIGS. 7A and 7B show weighted acyclic directed graphs that may be utilized to identify cycles of interest.

In one embodiment, a computer program maintains a single acyclic directed graph to identify cycles for probes that satisfy the two conditions discussed above. The edges are weighted and each time a cycle is utilized to synthesize a probe, the edge's weight is increased by 1. FIG. 7A shows such a weighted acyclic directed graph after the cycles for synthesizing probe 1 have been selected. Before any cycles are selected, all the diagonals have a weight of 0 (note: diagonals with a weight of 0 are not shown in order to simply the drawings). Thus, the cycles for synthesizing probe 1 would be 0 initially.

As shown, after the cycles for synthesizing probe 1 are selected, each of the weights for the edges of these cycles is incremented to 1. In order to satisfy condition 1, it is necessary that each of the possible edges have a weight of 4 or more. Different cycles that synthesize the desired probe may now be selected by finding a path that has the lowest combined weight. FIG. 7A shows that now the combined weights of the edges for the cycles for synthesizing probe 1 is now 4.

Figure 7B:
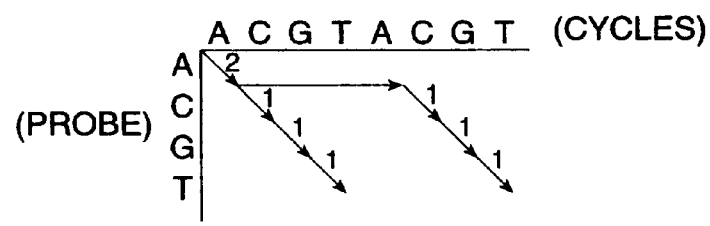

FIG. 7B shows the weighted acyclic directed graph of FIG. 7A if the cycles for synthesizing probe 5 (from above) are selected next. These cycles may be chosen next because the combined weights of the edges for these cycles was 1. Once these cycles are selected, the weight of the edge for the first A cycle is incremented to 2 while the weights of the diagonals for the second C, G and T cycles are incremented from 0 to 1. To produce distinct lists of cycles, the weights are altered. In a preferred embodiment, the weights are altered by increasing the weight of any edge corresponding to a synthesis cycle used in producing a previous probe.

Although many different cycles may be selected to synthesize probes with the same sequence in this manner (i.e., finding a path that has the lowest combined weight), it may happen that two or more paths keep repeating so new combinations of cycles are not found. Additionally, weighting the edges based on the number of times a cycle is used may satisfy the first condition, but the second condition may never be achieved.

There may be many weightings which cause the same path to be chosen as shortest. To avoid repetition, each list of cycles can be compared to the collection of previously chosen lists. If a match is found, the current list is not accepted and the graph is reweighted. In a preferred embodiment, the graph is reweighted as though the current list had been accepted. This exploits the inherent disorder of the probe sequence and allows for deterministic construction of sets of probes. If the probe sequence is not sufficiently disordered, this reweighting procedure can fall into a loop, producing the same lists of cycles repeatedly. This, however, can be detected as an error and a user can, for example, provide a probe with a more disordered sequence. Extensions of this reweighting scheme may not fall into loops. As an example, a random weight can be added to an edge or some other method of breaking ties among paths can be utilized.

Another use of weights is to enhance the probability that a list of cycles includes a selected cycle or to enhance the probability that a list of cycles does not include a selected cycle. In a preferred embodiment, the edges corresponding to a desired cycle have their weight decreased by a first predetermined value and the edges corresponding to an undesired cycle have their weight increased by a second predetermined value, where the first and second predetermined value can be different and are preferably relatively large (e.g., 1000 and 2000, respectively). By varying the predetermined values, it becomes possible to favor the "desirable" cycles more than disfavoring the "undesirable" cycles, and vice versa.

The weighted cycles that are chosen can be facilitated with the use of a matrix. FIG. 8 shows an example of a matrix that may be utilized to prevent the repetition of paths and to satisfy condition 2 above. There are eight cycles in this example: A, C, G, T, A, C, G, T. If these cycles are given numbers from 1–8, one may fill the matrix shown in FIG. 8 to improve the variety of selected cycles. The numbers on the top and side of the matrix correspond to the number of the cycles. Each number in the matrix indicates the number of probes that satisfy condition 2 for the indexed cycles. As shown, the matrix is symmetric around the diagonal specified by (n, n) wherein n=1–8.

The matrix has been filled according to the weighted directed acyclic graph of FIG. 7B (meaning that the paths for synthesizing probes 1 and 5 have been visited once). Element (1, 2) in the matrix has a number 1 that indicates that there is 1 probe that satisfies the condition that the first A cycle is utilized and the first C cycle is not utilized, or vice versa. Simply put, the matrix in FIG. 8 maintains the number of probes that satisfy condition 2 for any two cycles.

In order to satisfy condition 2, each element in the matrix should have a value of 2 or more. When a path is being chosen, the computer system that is designing the control probes may "force" a desired path by decreasing/increasing weights in the weighted directed acyclic graph. For example, if there are no probes that utilize the $3^{rd}$ cycle and the $8^{th}$ cycle, the system may decrease the weights along this path (and/or increase the weights along other paths) so that a path is chosen that utilizes the $3^{rd}$ cycle but not the $8^{th}$ cycle (i.e., satisfies condition 2) to synthesize a probe. Therefore, a combination of the weighted directed acyclic graph and the matrix may be utilized to select different lists of cycles for synthesizing a probe.

Up to this point, a single control probe has been described. This has been to simplify the examples above. However, it should be noted that even the simple example above demonstrates that it is not generally possible to utilize the first C cycle without also utilizing the first A cycle (because the control probe is 3'-ACGT). In preferred embodiments, four different control probes are synthesized that are complementary to portions of a control target. For example, if the control target is 5'-GACTTGCCATCGTAGAACTG, the following control probes may be utilized:

3'-CTGAACGGTAGCATCTT (C probe, SEQ ID NO:1)
    3'-TGAACGGTAGCATCTTG (T probe, SEQ ID NO:2)
    3'-GAACGGTAGCATCTTGA (G probe, SEQ ID NO:3)
    3'-AACGGTAGCATCTTGAC (A probe, SEQ ID NO:4)

These four control probes are all complementary to the control target at a different location and each control probe preferably both starts and ends with a different nucleotide as shown. By synthesizing each of these control probes with different cycles, a more comprehensive evaluation of the integrity of the synthesis of the probes may be achieved.

Figure 9:
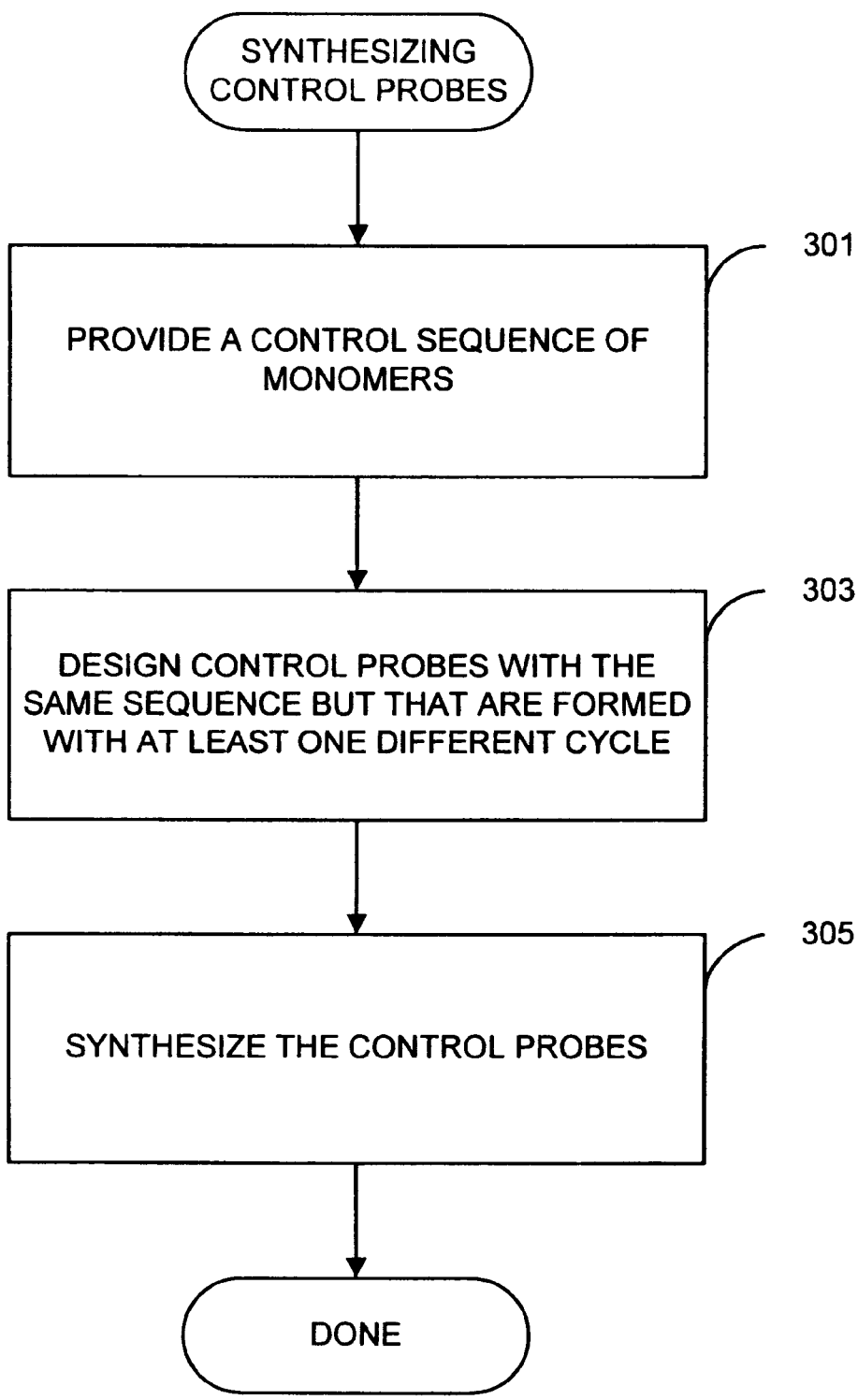
FIG. 9 shows a high level flowchart of a process of synthesizing control probes.

Now that an example has been described, it may be beneficial to describe an embodiment of the invention in more detail. FIG. 9 shows a high level flowchart of a process of synthesizing control probes to evaluate the integrity of the probe synthesis. At a step 301, a control sequence of monomers is provided. The control sequence of monomers is typically a control target that is added during chip hybridization. The control sequence may be specifically designed to allow for the detection of synthesis errors.

At a step 303, control probes are designed that have the same sequence of monomers but that are formed with at least one different cycle. The control probes have the same sequence and the sequence is chosen based upon a desired binding with the control target. Designing control probes includes selecting the cycles that will be utilized to synthesis each probe. In preferred embodiments, a computer system utilizes the conditions, directed acyclic graph and matrix described above to design the control probes. However, other techniques may be utilized to form the control probes within the spirit of the invention.

Once the control probes are designed, the control probes may be synthesized at a step 305. The control probes are synthesized according to the selected cycles for each probe.

Figure 10:
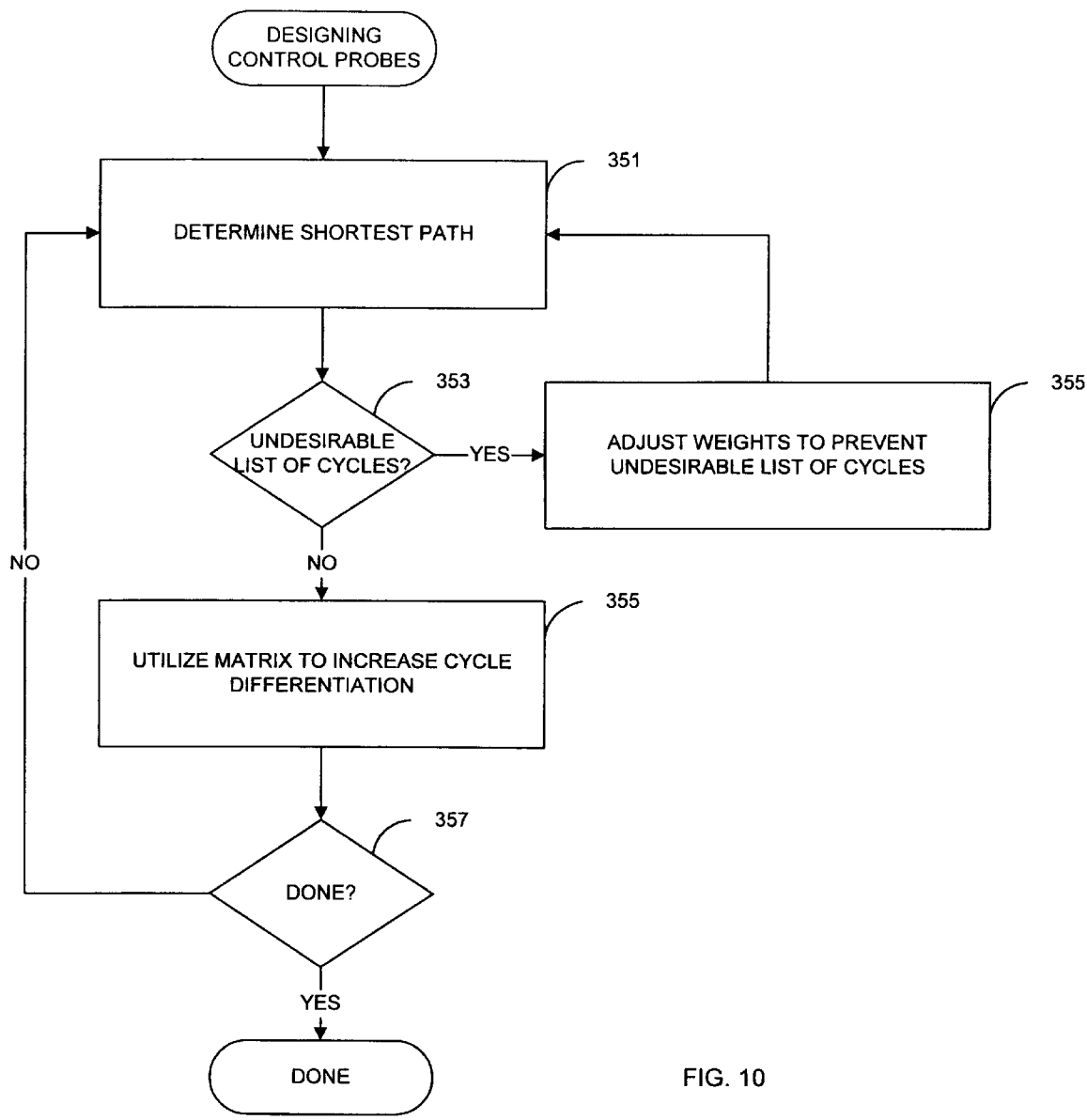
FIG. 10 shows a flowchart of a process of designing control probes.

FIG. 10 shows a flowchart of a process of designing control probes as depicted at step 303 of FIG. 9. At a step 351, the shortest path through the weighted directed acyclic graph is determined. The shortest path may be defined as the path with the lowest cost. Other implementations may define the shortest path in any number of ways including the highest cost where higher weights indicate desirable paths. Once a path is chosen, it may be represented as a list of monomer addition cycles.

A check is performed at a step 353 to see if the list of cycles is undesirable. Undesirable lists of cycles may be lists that have already been selected or they may be initialized as undesirable for other reasons (e.g., difficult to synthesize). If it is determined that the list of cycles forming the shortest path is undesirable, the weights on the directed acyclic graph are adjusted to prevent the undesirable list of cycles at a step 355. Preferably, the weights are adjusted so that when one weight goes up, another weight goes down. This technique has been found to better achieve the desired result of avoiding undesirable lists of cycles.

At a step 355, a matrix (e.g., see FIG. 8) is utilized to increase cycle differentiation. The matrix may be scanned to identify pairs of cycles that do not have enough differentiating probes between them. This may be indicated by a low number in the matrix. Once a pair of cycles is chosen as a pair that could use more differentiating probes, the weight of one cycle may be increased while the weight of the other is decreased. Typically, the weights are increased or decreased by one but it may be advantageous in other embodiments to use higher or different values. Since one cycle's weight has increased, while another cycle's weight decreased, the shortest path is more likely to include the first cycle and not the second.

If the desired number and/or variation of control probes have been established at a step 357, designing the control probes may be complete. Otherwise, the process may be repeated by starting at step 351.

Figure 11A:
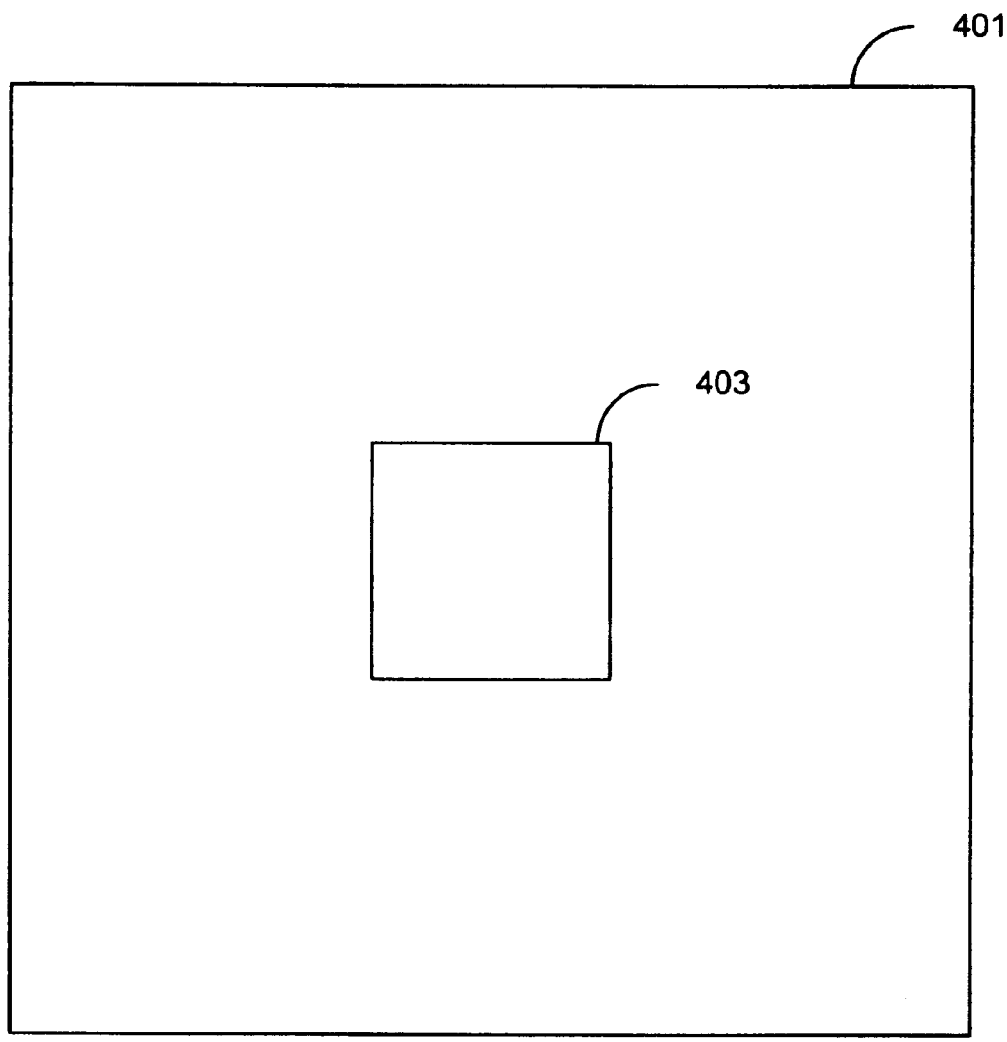
FIG. 11A shows a location of control probes on a chip and FIGS. 11B and 11C show images of the control probe region after hybridization and scanning.

The preceding has described how the control probes may be designed. FIG. 11A shows where the control probes may be actually synthesized on a chip. As shown, a chip 401 includes a relatively large area for the attachment of probes. The control probes are preferably synthesized on the chip in the center in a control probe region 403. By placing the control probes in the center of the chip, the control probes are better able to provide information concerning the synthesis of all the probes on the chip.

Figure 11B:
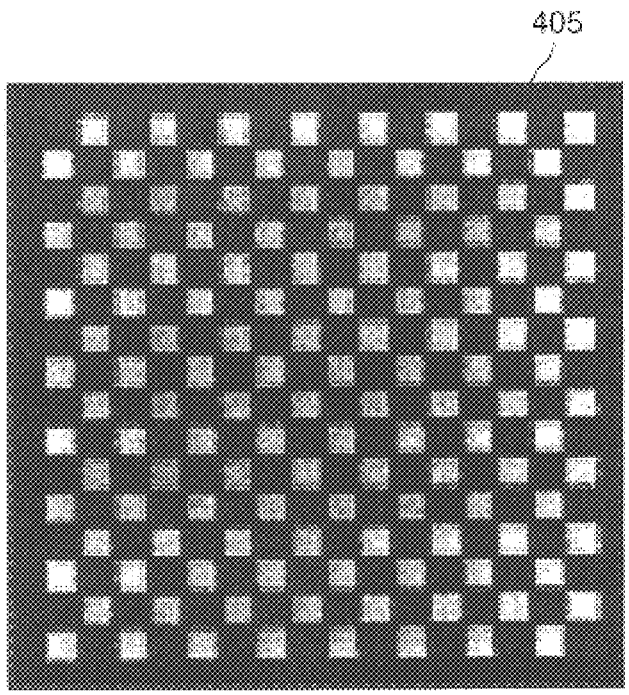

FIG. 11B shows an image of the control probe region of FIG. 11A after hybridization and scanning. An image 405 shows the control probes are placed in cells in a checkerboard pattern (i.e., control probes are in every other cell in both horizontal and vertical directions) on the chip to reduce edge effects during synthesis. Edge effects are described in more detail in U.S. patent application Ser. No. 09/059,779, filed Apr. 13, 1998, which is hereby incorporated by reference for all purposes. The relatively light regions correspond to cells that include control probes. As one can see, the intensities in each of the cells with control probes are approximately equal. This indicates that the hybridization affinity between each of the control probes and the control target is approximately the same, which is expected if there are no errors during probe synthesis.

Figure 11C:
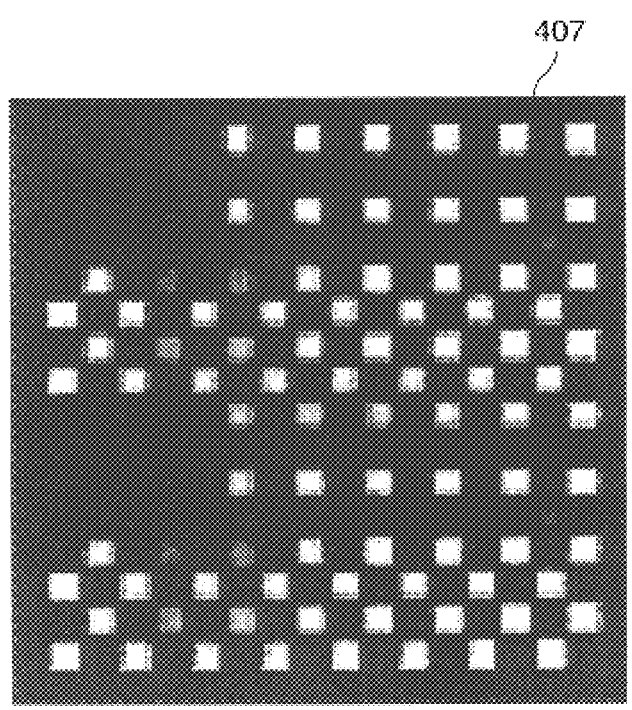
Figure 12:
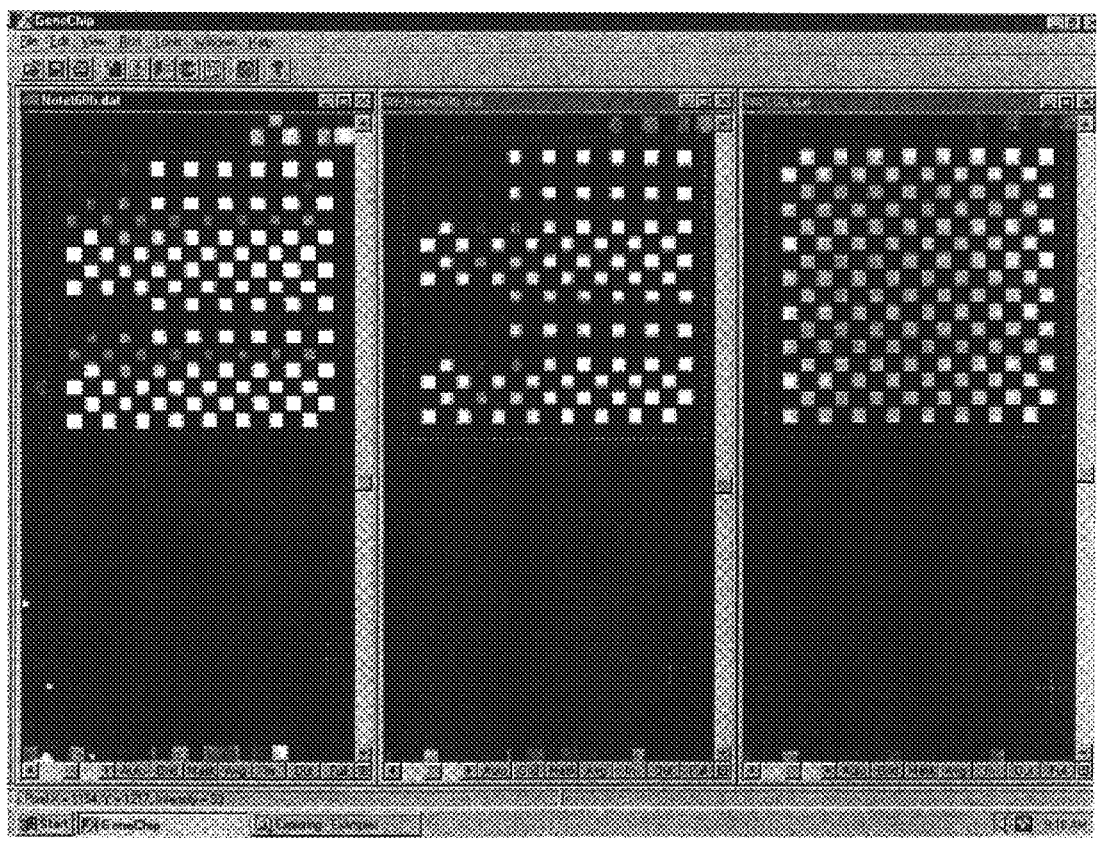
FIG. 12 shows a screen display of three control probe regions.

FIG. 11C shows another image of the control probe region of FIG. 11A after hybridization and scanning. However, in image 407, the intensities of each of the cells with controls are not approximately equal. Visually this indicates that some error occurred during probe synthesis. By analyzing the probes (and their respective cycles) that were affected by the error, it may be determined in what cycle the error occurred. FIG. 12 shows a screen display of three control probe regions. The left and middle images indicate an error occurred during synthesis while the right image indicates that no discernable error occurred.

It is often possible to determine the cycle and error that occurred by analyzing the image, probes affected and their respectively cycles. Other errors, like the selection of the wrong mask, are nearly impossible to determine since it may be unpredictable as to what probes were affected. Nevertheless, for process control purposes, it is beneficial to simply indicate if a chip is acceptable or unacceptable.

Figure 13:
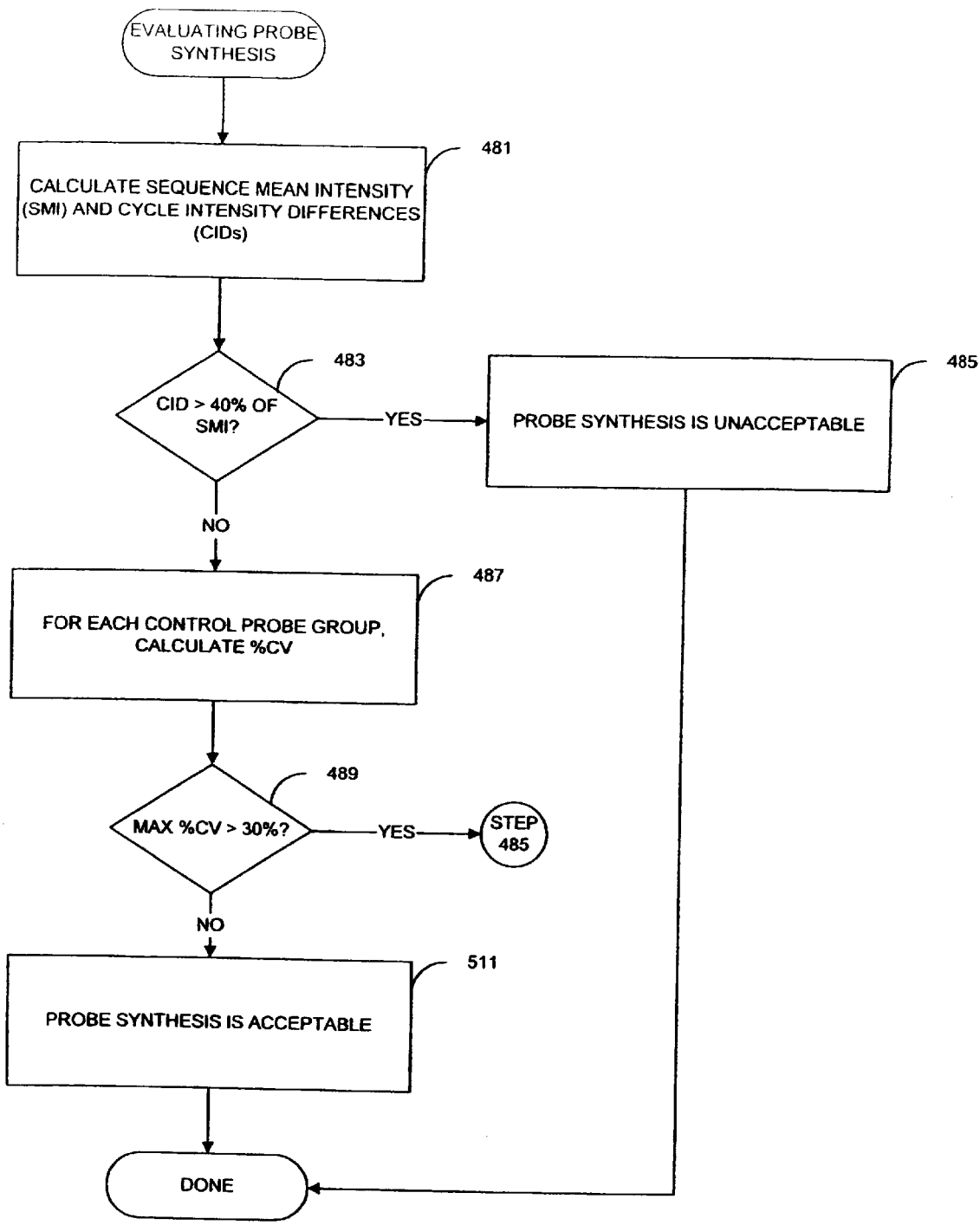
FIG. 13 shows a flowchart of a process that utilizes hybridization affinity information to determine if a chip is acceptable.

FIG. 13 shows a flowchart of a process that analyzes hybridization affinity information to determine if a chip is acceptable or unacceptable for quality control purposes. The process is designed to work with multiple sequences of control probes (i.e., there are different groups of control probes where each group of control probes has the same sequence, but each probe in a group is formed utilizing at least one different cycle). However, the process may also be advantageously applied to applications where only one sequence of control probe is utilized.

At a step 481, a mean of the intensities of all the control probes is calculated. By intensity it is meant the measured hybridization affinity of the control probe. Cycle intensity differences ("CIDs") are also calculated at step 481. A cycle intensity difference is the difference between the median of the intensity of all probes that were formed without utilizing a cycle and the median of the intensity of all probes that were formed utilizing the cycle. In preferred embodiments, hybridization affinity is measured as an intensity (e.g., derived from photon counts) but other information, including those described herein, may be utilized to measure hybridization affinity.

If a CID is greater than 40% of the mean of the intensities of all the control probes at a step 483, the probe synthesis is determined to be unacceptable at a step 485. Otherwise, a % CV is calculated for each control probe group at a step 487. A control probe group includes all the control probes that have the same sequence. % CV is the coefficient of variation and it is calculated by 100 multiplied by the standard deviation of the intensities for the control probe group divided by the mean of all the intensities of the control probes.

At a step 489, it is determined if the maximum % CV is greater than 30%. If the maximum % CV is greater than 30% then the probe synthesis is determined to be unacceptable at step 485. Otherwise, the probe synthesis is determined to be acceptable at a step 511.

Figure 14A:
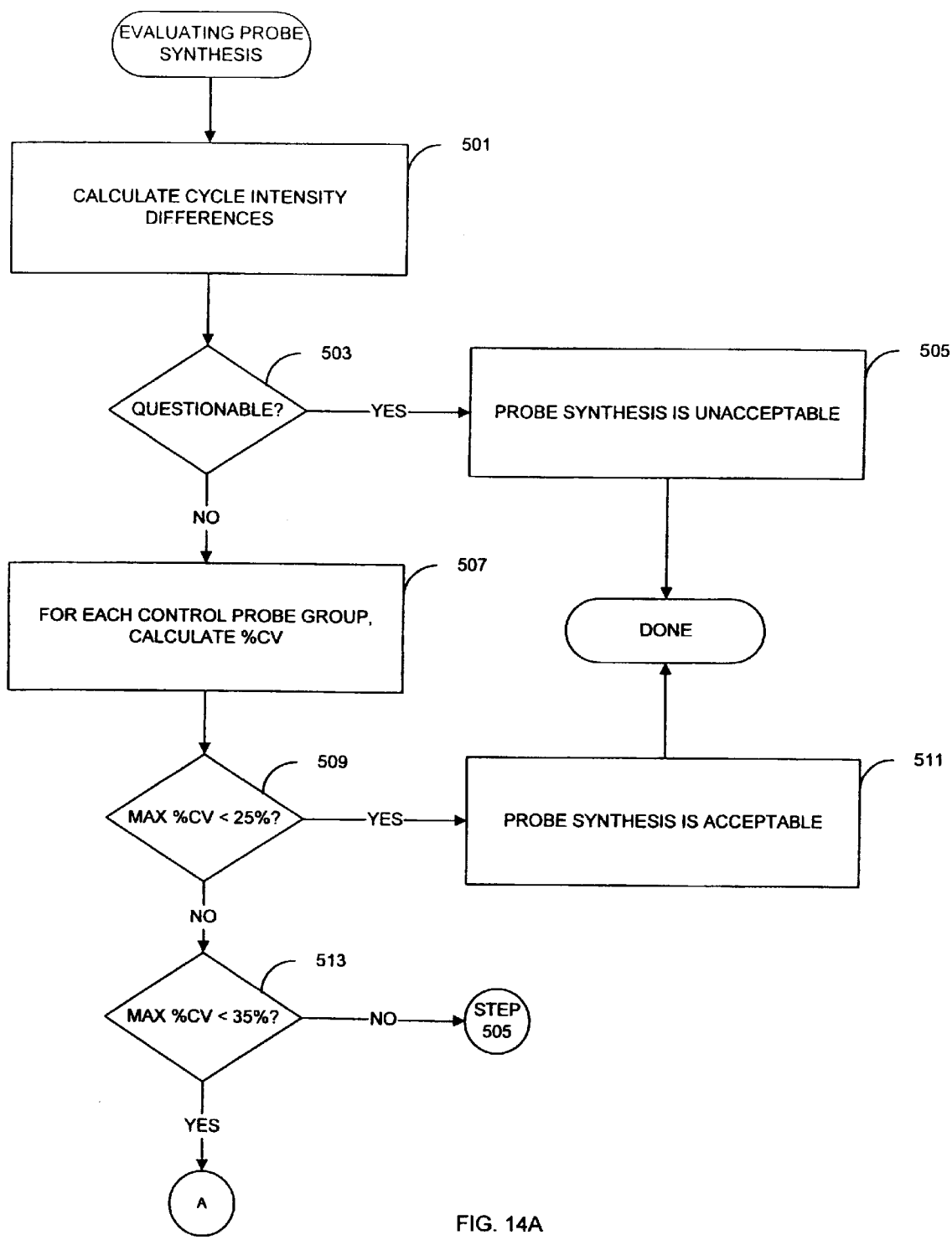
FIGS. 14A and 14B show a flowchart of another process that analyzes hybridization affinity information to determine if a chip is acceptable.
Figure 14B:
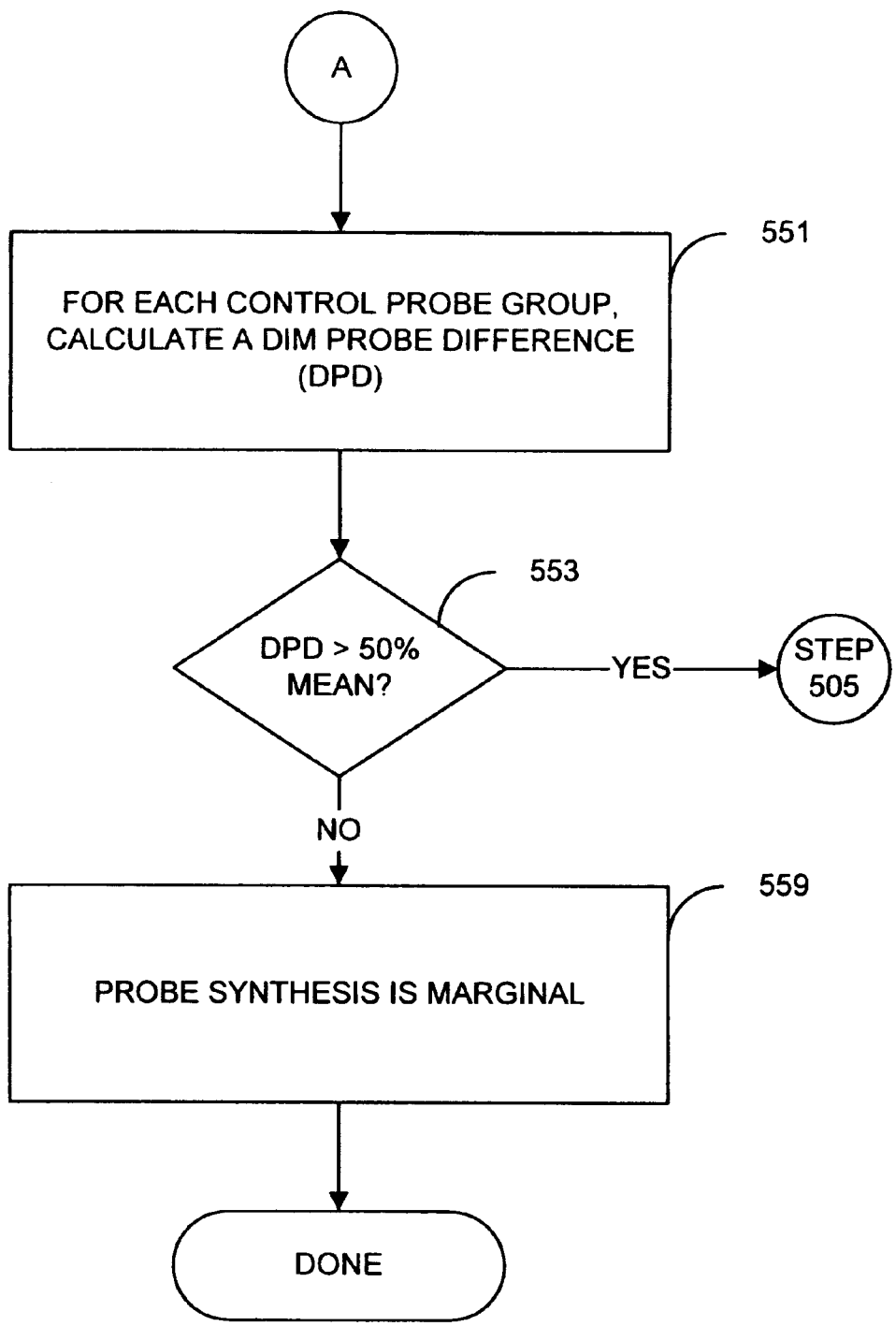

FIGS. 14A and 14B show a flowchart of another process that analyzes hybridization affinity information to determine if a chip is acceptable, marginal or unacceptable for quality control purposes. As above, the process is designed to work with multiple different sequences of control probes. However, the process may also be advantageously applied to applications where only one sequence of control probe is utilized.

At a step 501, cycle intensity differences are calculated. For each cycle, the cycle intensity difference is compared to both an interquartile range ("IQR") and an overall median of intensities for the control probes. IQR is a known statistical calculation that is the difference between the $75^{th}$ and $25^{th}$ percentile of a pool of values.

If the absolute value of a cycle intensity difference is greater than 3.5 times the IQR of all the intensities of the control probes or greater than 50% of the overall median of the intensities of the control probes, the probe synthesis is questionable and likely has errors. Therefore, the probe synthesis is determined to be unacceptable at a step 505. Otherwise, a % CV is calculated for each control probe group at a step 507. A control probe group includes all the control probes that have the same sequence. % CV is the coefficient of variation and it is calculated by 100 multiplied by the standard deviation of the intensities for the control probe group divided by the mean of all the intensities of the control probes.

At a step 509, it is determined if the maximum % CV is less than 25%. If the maximum % CV is less than 25% then the probe synthesis is determined to be acceptable at a step 511. Otherwise, it is determined if the maximum % CV is less than 35%. If the maximum % CV is not less than 35% then the probe synthesis is determined to be unacceptable at step 505.

Continuing on to FIG. 14B, an dim probe difference ("DPD") is calculated for each control probe group at a step 551. A DPD is the difference between the mean of the intensities for the control probes of a group and the mean of the intensities of the four dimmest (i.e., lowest intensity) control probes of the group. A large difference generally indicates that there is high variability in the intensities from the probes, whereas a low difference indicates that the intensities from the probes are relatively uniform. If, at a step 553, the DPD for a control probe group is greater than 50% of the mean of the intensities of all the control probes, the probe synthesis is determined to be unacceptable at step 505. Otherwise, it is determined that the probe synthesis is marginal at a step 559.

In one embodiment, the chip under inspection is given both a rating of acceptable, marginal or unacceptable, and an indication of where that determination was made in the flowchart of FIGS. 14A and 14B (e.g., through the use of numeric codes). Additionally, in the case of a marginal or unacceptable determination, an indication may be presented specifying which control probe group demonstrated the error or potential error (e.g., A, C, G, or T where the base indicates the first base in the control probes of the group).

The above has described preferred embodiments and has provided specific formulas and values (e.g., percentages)

that have provided excellent results. However, it may be beneficial to vary the formulas and values to suit specific experiments and systems. Thus, the invention is not limited to the specific embodiments described above.

Conclusion

While the above is a complete description of preferred embodiments of the invention, various alternatives, modifications, and equivalents may be used. It should be evident that the invention is equally applicable by making appropriate modifications to the embodiments described above. For example, the invention has been described in reference to nucleic acid probes that are synthesized on a chip. However, the invention may be advantageously applied to other monomers (e.g., amino acids and saccharides) and other hybridization techniques including those where the probes are not attached to a substrate. Therefore, the above description should not be taken as limiting the scope of the invention that is defined by the metes and bounds of the appended claims along with their full scope of equivalents.

What is claimed is:

1. A method of designing nucleic acid probes, comprising: providing a control sequence of nucleotides and designing nucleic acid probes that have the same sequence of nucleotides and will bind with the control sequence, wherein the nucleotides comprising the same sequence are formed with at least one common and at least one different nucleotide addition cycle.

2. The method of claim 1, wherein each nucleic acid probe is represented as a list of nucleotide addition cycles.

3. The method of claim 2, wherein designing nucleic acid probes comprises:

determining a shortest path with a weighted directed acyclic graph to generate a list of nucleotide addition cycles for synthesizing nucleic acid probes with the same sequence of nucleotides, and utilizing a matrix to increase cycle differentiation.

4. The method of claim 3, wherein if the list of nucleotide addition cycles generated by determining a shortest path is undesirable, weights on the weighted directed acyclic graph are adjusted to prevent undesirable lists of nucleotide addition cycles.

5. The method of claim 1, wherein the nucleic acid probes are attached to a substrate.

6. A computer program product that designs polymer probes, comprising:

computer code that receives a control sequence of nucleotides;

computer code that designs nucleic acid probes that have the same sequence of nucleotides and will bind with the control sequence, wherein the nucleotides comprising the same sequence are formed with at least one common and at least one different nucleotide addition cycle; and a computer readable medium that stores the computer codes.

7. The computer program product of claim 6, wherein the computer readable medium is selected from the group consisting of floppy disk, tape, flash memory, system memory, hard drive, and a data signal embodied in a carrier wave.

8. The computer program product of claim 6, wherein each nucleic acid probe is represented as a list of nucleotide addition cycles.

9. The computer program product of claim 8, wherein the computer code that designs nucleic acid probes comprises:

computer code that determines a shortest path with a weighted directed acyclic graph to generate a list of nucleotide addition cycles for synthesizing nucleic acid probes with the same sequence of nucleotides; and computer code that utilizes a matrix to increase cycle differentiation.

10. The computer program product of claim 9, wherein if the list of nucleotide addition cycles generated by the computer code that determines a shortest path is undesirable, weights on the weighted directed acyclic graph are adjusted to prevent undesirable lists of nucleotide addition cycles.

11. The computer program product of claim 6, wherein the nucleic acid probes are attached to a substrate.

* * * * *